(12) United States Patent
Difazio et al.

(10) Patent No.: US 7,891,570 B2
(45) Date of Patent: Feb. 22, 2011

(54) PHOTODIODE WITH IMPROVED PERFORMANCE IN AMBIENT LIGHT

(75) Inventors: Costanzo Difazio, East Patchogue, NY (US); Dmitriy Yavid, Stony Brook, NY (US); Miklos Stern, Woodmere, NY (US); Chinh Tan, Setauket, NY (US); Askold Strat, Sound Beach, NY (US); Daniel Gonzalez, Setauket, NY (US)

(73) Assignee: Microvision, Inc., Redmond, WA (US)

( * ) Notice: Subject to any disclaimer, the term of this patent is extended or adjusted under 35 U.S.C. 154(b) by 837 days.

(21) Appl. No.: 11/711,982

(22) Filed: Feb. 28, 2007

(65) Prior Publication Data

US 2008/0203164 A1 Aug. 28, 2008

(51) Int. Cl.
G02B 26/10 (2006.01)
(52) U.S. Cl. .......................... 235/462.25; 235/462.06; 235/454
(58) Field of Classification Search ............ 235/462.25, 235/462.06, 454
See application file for complete search history.

(56) References Cited

U.S. PATENT DOCUMENTS

| | | | |
|---|---|---|---|
| 5,576,645 A * | 11/1996 | Farwell | 327/94 |
| 5,600,121 A | 2/1997 | Kahn et al. | |
| 5,734,153 A | 3/1998 | Swartz et al. | |
| 5,923,021 A | 7/1999 | Dvorkis et al. | |
| 5,978,124 A * | 11/1999 | Maekawa et al. | 398/197 |
| 6,045,044 A * | 4/2000 | Coleman | 235/462.49 |
| 6,232,804 B1 * | 5/2001 | Shigenobu et al. | 327/94 |
| 6,549,043 B2 * | 4/2003 | Roovers | 327/94 |
| 6,560,256 B1 * | 5/2003 | Seki et al. | 372/38.02 |
| 7,128,264 B2 | 10/2006 | Barkan et al. | |
| 7,446,806 B2 * | 11/2008 | Carlson et al. | 348/308 |
| 2006/0091294 A1 * | 5/2006 | Frank et al. | 250/214 B |

* cited by examiner

*Primary Examiner*—Ahshik Kim
(74) *Attorney, Agent, or Firm*—Kevin D. Wills

(57) ABSTRACT

An arrangement for improving performance of a sensor operative for collecting light from a target to generate a data signal in a presence of ambient light, includes a sample and hold circuit for operating the sensor during a sampling time period in which the sensor only collects the ambient light to generate an ambient signal, and during a holding time period in which the sensor collects both the ambient light and the light from the target to generate a composite signal comprised of the ambient signal and the data signal; and a subtracting circuit operative for subtracting the ambient signal from the composite signal to produce the data signal as an output.

6 Claims, 2 Drawing Sheets

PHOTODIODE WITH IMPROVED PERFORMANCE IN AMBIENT LIGHT

BACKGROUND OF THE INVENTION

1. Field of the Invention

The present invention generally relates to sensors for collecting light from a target in the presence of ambient light and, more particularly, to improving the performance of such sensors, especially as used in electro-optical readers, such as laser scanners for reading indicia, such as bar code symbols, and in laser safety circuits for monitoring the output power of lasers, such as are used in laser scanners and in laser projection displays.

2. Description of the Related Art

Bar code readers are known in the prior art for reading various symbologies such as Universal Product Code (UPC) bar code symbols appearing on a label, or on the surfaces of an article. The bar code symbol itself is a coded pattern of graphic indicia comprised of a series of bars of various widths spaced apart from one another to bound spaces of various widths, the bars and spaces having different light reflecting characteristics. The readers electro-optically transform the graphic indicia into electrical signals, which are decoded into information, typically descriptive of the article or some characteristic thereof. Such information is conventionally represented in digital form and used as an input to a data processing system for applications in point-of-sale processing, inventory control, and the like.

Readers of this general type have been disclosed, for example, in U.S. Pat. No. 5,600,121, and may employ a portable laser scanning device held by a user, which is configured to allow the user to aim the device and, more particularly, a scanning laser light beam, at a targeted symbol to be read. In moving laser beam readers known in the art, the laser light beam is focused by a lens or other optical components along a light path as a beam spot on a target that includes the bar code symbol. The moving-beam reader operates by repetitively scanning the beam spot in a scan pattern across the symbol by means of motion of a scanning component, such as a moving scan mirror placed in the path of the light beam. The scanning component may either sweep the beam spot across the symbol and trace a scan line, or a series of scan lines, or another pattern, across the symbol, or scan a field of view of the reader, or both.

Bar code readers also include a sensor or photodetector which detects light reflected or scattered from the symbol. The photodetector or sensor is positioned in the reader in an optical path so that it has a field of view which ensures the capture of a portion of the light which is reflected or scattered off the symbol. The light is detected and converted into an electrical signal. Electronic circuitry and software decode the electrical signal into a digital representation of the data represented by the symbol that has been scanned. For example, the analog electrical signal generated by the photodetector is converted by a digitizer into a pulse width modulated digitized signal, with the widths corresponding to the physical widths of the bars and spaces. Such a digitized signal is then decoded, based on the specific symbology used by the symbol, into a binary representation of the data encoded in the symbol, and subsequently to the information or alphanumeric characters so represented. Such signal processors are disclosed in U.S. Pat. No. 5,734,153.

Bar code readers are required to work under variable ambient lighting conditions, including indoor office lighting and outdoor sunlight, both indoor and outdoor lighting ranging from dim to bright. A combination of optical and electrical measures is employed to prevent bright ambient light from overwhelming the reader and preventing a successful decoding and reading of a symbol to be read. Such measures can be optimized for indoor or outdoor lighting at anticipated light intensity levels, but not for both. Thus, performance is sacrificed when a reader is required to work at non-optimized light intensity levels.

In a typical retro-reflective or non-retro-reflective reader, collection optics collect the laser light scattered from the symbol and concentrate the collected light onto a photodiode acting as the sensor. The collection optics also unavoidably collects ambient light and concentrates it on the photodiode. The photodiode generates an electrical composite signal proportional to the brightness of the total collected light from the symbol and from the ambient light. The composite signal is comprised of a data signal derived from the symbol and an ambient signal derived from the ambient light. If the ambient signal is high due to very bright ambient light, or if the ambient signal is on the same order of magnitude as the data signal as in the case where the reader is operating at the end of its useful working range, then the reader may not function because the data signal derived from the symbol will be lost.

Photodiodes are not only used in collection optics in a laser scanner, but are also used in laser safety monitoring circuits in laser scanners and laser projection display arrangements. As is known, a laser projection display arrangement projects a two-dimensional image in color on a screen based on a pair of scan mirrors which oscillate in mutually orthogonal directions to scan a plurality of differently colored laser beams, for example, red, blue and green, over a raster pattern of scan lines, each scan line having a number of pixels. A controller processes video data from a host, as well as control data with the host in order to form the image by selectively energizing and deenergizing a plurality of lasers that emit the laser beams.

In the event that a laser beam exits a device, such as a laser scanner or a laser projection display arrangement, the output power of each exiting beam is monitored by a photodiode and, if the monitored output power exceeds a safety value, then the safety circuit deenergizes the laser that emitted the beam. If the ambient signal is on the same order of magnitude as the monitored output power data signal, then the safety circuit may not function.

The prior art has proposed in FIGS. 9-11 of U.S. Pat. No. 5,923,021 preamplifier circuits for processing the output signal from a photodiode. These circuits include components that reduce the resistance of a feedback resistor, thereby reducing gain and worsening the signal-to-noise ratio, or that introduce shot or white noise from bipolar transistors and diodes which again worsen the signal-to-noise ratio. Hence, such preamplifier circuits are unsatisfactory for enabling a reader to perform reliably under all lighting conditions.

U.S. Pat. No. 7,128,264 discloses an arrangement for nulling ambient current in a photodiode circuit. However, this arrangement utilizes a low frequency, low pass filtering circuit that requires large bulky capacitors, and undesirably increases the size, weight and assembly cost of the arrangement.

SUMMARY OF THE INVENTION

One feature of the present invention resides, briefly stated, in an arrangement for, and a method of, improving performance of a sensor operative for collecting light from a target to generate a data signal in a presence of ambient light. The arrangement comprises a sample and hold circuit for operating the sensor during a sampling time period in which the sensor only collects the ambient light to generate an ambient signal, and during a holding time period in which the sensor collects both the ambient light and the light from the target to generate a composite signal comprised of the ambient signal and the data signal; and a subtracting circuit for subtracting the ambient signal from the composite signal to produce the data signal as an output.

Preferably, the sensor is a photodiode that generates the composite signal and the ambient signal as electrical current signals, and the subtracting circuit includes a transimpedance amplifier that generates the data signal at the output as an electrical voltage signal. The transimpedance amplifier has a non-inverting input to which the composite signal is applied, and an inverting input to which the ambient signal is applied.

The sample and hold circuit includes a switch for switching between the sampling and holding time periods, and a pair of sample and hold transistors connected to the switch and the transimpedance amplifier, one sample and hold transistor being operative for conducting the composite signal to the non-inverting input, and the other sample and hold transistor being operative for conducting the ambient signal to the inverting input. A reference transistor is connected to one of the sample and hold transistors, and a biasing circuit is operative for biasing the reference transistor. The biasing circuit preferably includes a d.c. current sink and a biasing transistor.

In accordance with this aspect of the invention, sampling is used to perform the function of low pass filtering and, hence, the prior art need for large bulky capacitors has been eliminated. The entire arrangement can be fully and cost effectively integrated into an application specific integrated circuit with all the benefits of reduced cost, size, weight and complexity, as well as the inherent higher processing speed and higher overall small signal bandwidth.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
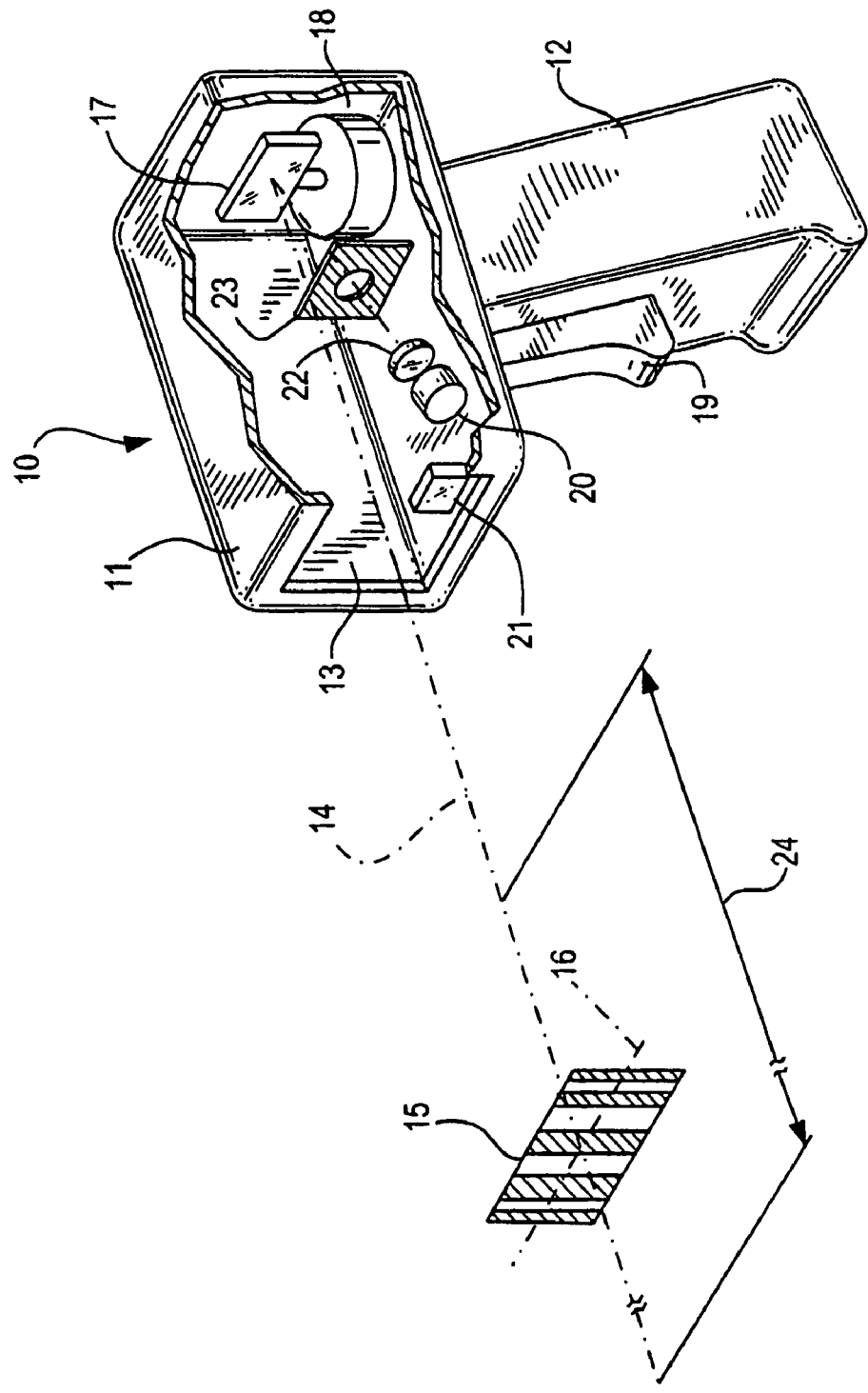
FIG. 1 is a perspective view of a non-retro-reflective electro-optical reader in accordance with the prior art.

As used herein, the term "symbol" broadly encompasses not only symbol patterns composed of alternating bars and spaces of various widths as commonly referred to as bar code symbols, but also other one- or two-dimensional graphic patterns, as well as alphanumeric characters. In general, the term "symbol" may apply to any type of pattern or indicia which may be recognized or identified either by scanning a light beam and detecting reflected or scattered light as a representation of variations in light reflectivity at various points of the pattern or indicia. FIG. 1 shows an indicia 15 as one example of a "symbol" to be read.

FIG. 1 depicts a handheld laser scanner device 10 for reading symbols. The laser scanner device 10 includes a housing having a barrel portion 11 and a handle 12. Although the drawing depicts a handheld pistol-shaped housing, the invention may also be implemented in other types of housings such as a desk-top workstation or a stationary scanner. In the illustrated embodiment, the barrel portion 11 of the housing includes an exit port or window 13 through which an outgoing laser light beam 14 passes to impinge on, and scan across, the bar code symbol 15 located at some distance from the housing.

The laser beam 14 moves across the symbol 15 to create a scan pattern. Typically, the scanning pattern is one-dimensional or linear, as shown by line 16. This linear scanning movement of the laser beam 14 is generated by an oscillating scan mirror 17 driven by an oscillating motor 18. If desired, means may be provided to scan the beam 14 through a two-dimensional scanning pattern, to permit reading of two-dimensional optically encoded symbols. A manually-actuated trigger 19 or similar means permits an operator to initiate the scanning operation when the operator holds and aims the device 10 at the symbol 15.

The scanner device 10 includes a laser source 20, e.g., a gas laser tube or a semiconductor laser diode, mounted within the housing. The laser source 20 generates the laser beam 14. A photodetector 21 is positioned within the housing to collect at least a portion of the light reflected and scattered from the bar code symbol 15. The photodetector 21, as shown, faces toward the window 13 and has a static, wide field of view characteristic of the non-retro-reflective readers described above.

Alternatively, in a retro-reflective reader, a concave portion of the scan mirror 17 may focus collected light on the photodetector 21, in which case the photodetector faces toward the scan mirror. As the beam 14 sweeps the symbol 15, the photodetector 21 detects the light reflected and scattered from the symbol 15 and creates an analog electrical signal proportional to the intensity of the collected light. Details of the processing of this analog signal, especially in different ambient lighting conditions, form the basis of this invention and are described in detail below.

A digitizer (not shown) typically converts the analog signal into a pulse width modulated digital signal, with the pulse widths and/or spacings corresponding to the physical widths of the bars and spaces of the scanned symbol 15. A decoder (not shown), typically comprising a programmed microprocessor with associated RAM and ROM, decodes the pulse width modulated digital signal according to the specific symbology to derive a binary representation of the data encoded in the symbol, and the alphanumeric characters represented by the symbol.

The laser source 20 directs the laser beam through an optical assembly comprising a focusing lens 22 and an aperture stop 23, to modify and direct the laser beam onto the scan mirror 17. The mirror 17, mounted on a vertical shaft and oscillated by the motor drive 18 about a vertical axis, reflects the beam and directs it through the exit port 13 to the symbol 15.

To operate the scanner device 10, the operator depresses trigger 19 which activates the laser source 20 and the motor 18. The laser source 20 generates the laser beam which passes through the element 22 and aperture 23 combination. The element 22 and aperture 23 modify the beam to create an intense beam spot of a given size which extends continuously and does not vary substantially over a range 24 of working distances. The element and aperture combination directs the beam onto the rotary mirror 17, which directs the modified laser beam outwardly from the scanner housing 11 and toward the bar code symbol 15 in a sweeping pattern, i.e., along scan line 16. The bar code symbol 15, placed at any point within the working distance 24, reflects and scatters a portion of the laser light. The photodetector 21, shown mounted in the scanner housing 11 in a non-retro-reflective position, detects the reflected and scattered light and converts the received light into an analog electrical signal. The photodetector could also be mounted in a retro-reflective position facing the scan mirror 17. The system circuitry then converts the analog signal to a pulse width modulated digital signal which a microprocessor-based decoder decodes according to the characteristics of the bar code symbology rules.

Figure 2:
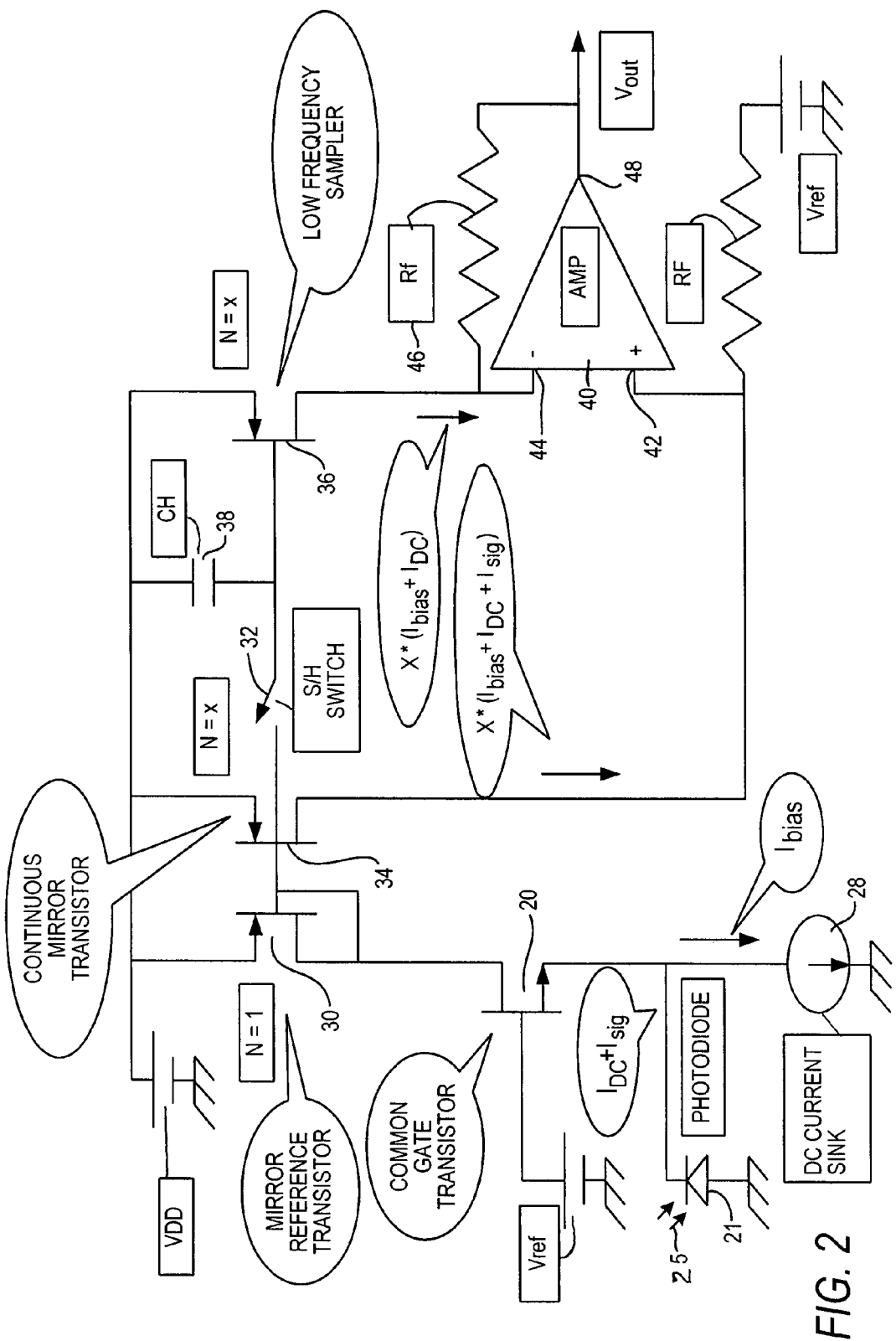
FIG. 2 is a circuit schematic of an arrangement for improving performance of a photodiode in accordance with this invention for use in the reader of FIG. 1.

In accordance with this invention, as shown in FIG. 2, the photodetector 21, shown as a photodiode, collects light 25 from the symbol 15, as well as from ambient light, and generates a composite current signal whose magnitude is proportional to the intensity of the collected light. Thus, the composite signal includes a data current signal $I_{sig}$ that corresponds to the information encoded in the symbol, as well as a noise current signal $I_{DC}$ that corresponds to the ambient light. The noise signal is, of course, undesirable and has a d.c. component and slow varying currents such as dark currents.

A d.c. current sink 26 and a common gate input transistor 28 are connected to the photodiode 21 and are used to bias a reference transistor 30 with a bias current $I_{bias}$. A sample and hold (S/H) circuit includes a S/H switch 32 for switching between successive sampling and holding time periods, and a pair of S/H mirror transistors 34, 36 connected to opposite sides of the switch. An S/H capacitor 38 is connected between the gate terminals of the mirror transistors 34, 36 and their source terminals.

A time period is chosen when the laser 20 is off, and only ambient current is generated by the photodiode 21. During this time period, i.e., the sampling period, the switch 32 is closed, and the two mirror transistors 34,36 having equal scaling factors (N=x) make two identical copies of the current $(I_{bias}+I_{DC})$ in the reference transistor 30 scaled by the scaling ratio x. During the sampling period, the capacitor 38 is charged to the operating voltage of the mirror transistor 30.

After the sampling period is over, the laser 20 is turned on, and both the ambient current and the data current are generated by the photodiode 21. During this holding period, the switch 32 is opened. Since the capacitor 38 remembers the operating voltage when the switch was closed, the current in the mirror transistor 36 will flow at the same level as when the switch was open. Thus, the current in the mirror transistor 36 will be the scaled ambient signal $[x^*(I_{bias}+I_{DC})]$, and the current in the mirror transistor 34 will be the scaled composite signal $[X^*(I_{bias}+I_{DC}+I_{sig})]$.

A subtracting circuit for subtracting the ambient signal from the composite signal to produce the data signal as an output includes a differential transimpedance amplifier 40 that generates the data signal at an output 48 as an electrical voltage signal. The transimpedance amplifier 40 has a non-inverting input 42 to which the composite signal is applied, and an inverting input 44 to which the ambient signal is applied. A resistor $R_f$ is connected across the inverting input 44 and the output 48 of the amplifier 40. The voltage signal at the output 48 can be represented as: $R_f^*[x^*(I_{bias}+I_{DC}+I_{sig})]$. By choosing the d.c. bias signal to be large, the overall bandwidth of the circuit of FIG. 2 is increased. This arrangement increases the signal bandwidth due to the d.c. biasing of the current mirrors.

It will be understood that each of the elements described above, or two or more together, also may find a useful application in other types of constructions differing from the types described above.

For example, as noted above, photodiodes are not only used in collection optics in a laser scanner, but are also used in laser safety monitoring circuits in laser scanners and laser projection display arrangements. As is known, a laser projection display arrangement projects a two-dimensional image in color on a screen based on a pair of scan mirrors which oscillate in mutually orthogonal directions to scan a plurality of differently colored laser beams, for example, red, blue and green, over a raster pattern of scan lines, each scan line having a number of pixels. A controller processes video data from a host, as well as control data with the host in order to form the image by selectively energizing and deenergizing a plurality of lasers that emit the laser beams.

In the event that a laser beam exits a device, such as a laser scanner or a laser projection display arrangement, the output power of each exiting beam is monitored by a photodiode and, if the monitored output power exceeds a safety value, then the safety circuit deenergizes the laser that emitted the beam. If the ambient signal is on the same order of magnitude as the monitored output power data signal, then the safety circuit may not function. The circuit of FIG. 2 is readily integratable into a safety monitoring circuit and, in the case of a color laser projection display having three lasers, is of particular benefit in reducing the size, weight and complexity of the overall arrangement.

While the invention has been illustrated and described as embodied in an electro-optical reader with improved performance for the photodiode in ambient light, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for improving performance of a sensor operative for collecting light from a target to generate a data signal in a presence of ambient light, comprising:
   a sample and hold circuit for operating the photodiode during a sampling time period in which the sensor only collects the ambient light to generate an ambient electrical current signal, and during a holding time period in which the sensor collects both the ambient light and the light from the target to generate a composite electrical current signal comprised of the ambient signal and the data signal; and
   a subtracting circuit for subtracting the ambient signal from the composite signal to produce the data signal as an output, the subtracting circuit including a transimpedance amplifier that generates the data signal at the output as an electrical voltage signal, the transimpedance amplifier having a non-inverting input to which the composite signal is applied, and an inverting input to which the ambient signal is applied,
   wherein the sample and hold circuit includes a switch for switching between the sampling and holding time periods, and a pair of sample and hold transistors connected to the switch and the transimpedance amplifier, one sample and hold transistor being operative for conducting the composite signal to the non-inverting input, and the other sample and hold transistor being operative for conducting the ambient signal to the inverting input.

2. The arrangement of claim 1, and a reference transistor connected to one of the sample and hold transistors, and a biasing circuit for biasing the reference transistor, and wherein the biasing circuit includes a d.c. current sink and a biasing transistor.

3. An arrangement for improving performance of a sensor means operative for collecting light from a target to generate a data signal in a presence of ambient light, comprising:
   sample and hold means for operating the sensor means during a sampling time period in which the sensor means only collects the ambient light to generate an ambient electrical current signal, and during a holding time period in which the sensor means collects both the ambient light and the light from the target to generate a composite electrical current signal comprised of the ambient signal and the data signal; and
   subtracting means for subtracting the ambient signal from the composite signal to produce the data signal as an output, the subtracting means including a transimpedance amplifier means that generates the data signal at the output as an electrical voltage signal, the transimpedance amplifier means having a non-inverting input to which the composite signal is applied, and an inverting input to which the ambient signal is applied,
   wherein the sample and hold means includes switch means for switching between the sampling and holding time periods, and a pair of sample and hold transistor means connected to the switch means and the transimpedance amplifier means, one sample and hold transistor means being operative for conducting the composite signal to the non-inverting input, and the other sample and hold transistor means being operative for conducting the ambient signal to the inverting input.

4. The arrangement of claim 3, and a reference transistor means connected to one of the sample and hold transistor means, and a biasing means for biasing the reference transistor means, and wherein the biasing means includes a d.c. current sink and a biasing transistor.

5. A method of improving performance of a sensor operative for collecting light from a target to generate a data signal in a presence of ambient light, comprising the steps of:
   operating the sensor during a sampling time period in which the sensor only collects the ambient light to generate an ambient electrical current signal, and during a holding time period in which the sensor collects both the ambient light and the light from the target to generate a composite electrical current signal comprised of the ambient signal and the data signal; and
   subtracting the ambient signal from the composite signal to produce the data signal as an output, the subtracting step being performed by a transimpedance amplifier that generates the data signal at the output as an electrical voltage signal, the transimpedance amplifier being formed with a non-inverting input to which the composite signal is applied, and with an inverting input to which the ambient signal is applied,
   wherein the operating step is performed by switching between the sampling and holding time periods, and by connecting a pair of sample and hold transistors to the transimpedance amplifier, one sample and hold transistor being operative for conducting the composite signal to the non-inverting input, and the other sample and hold transistor being operative for conducting the ambient signal to the inverting input.

6. The method of claim 5, and connecting a reference transistor to one of the sample and hold transistors, and biasing the reference transistor with a d.c. current sink and a biasing transistor.

* * * * *